(12) United States Patent
Nakamura et al.

(10) Patent No.: US 11,241,000 B2
(45) Date of Patent: Feb. 8, 2022

(54) DUAL-BEARING REEL

(71) Applicant: Shimano Inc., Osaka (JP)

(72) Inventors: Kohei Nakamura, Osaka (JP); Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/995,061

(22) Filed: Aug. 17, 2020

(65) Prior Publication Data

US 2021/0112797 A1    Apr. 22, 2021

(30) Foreign Application Priority Data

Oct. 16, 2019 (JP) .............................. JP2019-189641

(51) Int. Cl.
*A01K 89/01*    (2006.01)
*A01K 89/015*   (2006.01)

(52) U.S. Cl.
CPC ................................. *A01K 89/015* (2013.01)

(58) Field of Classification Search
CPC ............ A01K 89/0183; A01K 89/0189; A01K 89/01901; A01K 89/0191; A01K 89/015
See application file for complete search history.

(56) References Cited

U.S. PATENT DOCUMENTS

| | | | |
|---|---|---|---|
| 2007/0181728 A1* | 8/2007 | Kawasaki | ................ C09D 5/08 242/310 |
| 2012/0067993 A1* | 3/2012 | Nakagawa | ....... A01K 89/01901 242/257 |
| 2013/0193250 A1* | 8/2013 | Ikebukuro | ............ A01K 89/015 242/261 |
| 2016/0249595 A1* | 9/2016 | Haraguchi | ......... A01K 89/0192 242/283 |
| 2019/0297865 A1* | 10/2019 | Bin Ismail | ......... A01K 89/0193 |

FOREIGN PATENT DOCUMENTS

JP    2010-172203 A    8/2010

* cited by examiner

*Primary Examiner* — Emmanuel M Marcelo
(74) *Attorney, Agent, or Firm* — Global IP Counselors, LLP

(57) ABSTRACT

A dual-bearing reel includes a frame, a clutch yoke and a guide member. The guide member guides the clutch yoke in an axial direction. The guide member includes a metal body attached to the frame, metal shaft members extending from the body and resin cover portions that cover the shaft members and are inserted into through holes in the clutch yoke.

8 Claims, 7 Drawing Sheets

DUAL-BEARING REEL

CROSS-REFERENCE TO RELATED APPLICATIONS

This application claims priority to Japanese Patent Application No. 2019-189641, filed on Oct. 16, 2019. The entire disclosure of Japanese Patent Application No. 2019-189641 is hereby incorporated herein by reference.

BACKGROUND

Field of the Invention

The present invention relates to a dual-bearing reel, particularly a dual-bearing reel having a clutch mechanism for connecting and disconnecting a handle and a spool.

Background Art

A conventional dual-bearing reel includes a clutch mechanism between the handle and the spool (See Japanese Laid-Open Patent Application No. 2010-172203, for example). The clutch mechanism connects and disconnects the handle and the spool.

A conventional dual-bearing reel further includes a clutch yoke and a guide member. The clutch yoke is a member that switches the clutch mechanism between an engaged state and a disengaged state. The guide member guides the clutch yoke in the axial direction.

For example, the guide member includes a fixed part fixed to a frame and a pair of guide shafts extending from the fixed part. The pair of guide shafts is integral with the fixed part, and guides the clutch yoke in the axial direction.

SUMMARY

With a conventional dual-bearing reel, a clutch yoke moves a pinion gear in the axial direction, so that the pinion gear can mesh with a drive gear. Since the guide member guides the clutch yoke in the axial direction, the guide member is generally made of a high strength metal. However, it has been found that a high tensile strength metal guide member can cause problems, since such a guide member tends to be heavy.

Also, since water or salt water is likely to stick to the guide member, the guide member is generally formed from a metal with high corrosion resistance. However, it has been found that a high corrosion resistance metal guide member can cause problems, since a guide member formed from such material can cause the slidability of the clutch yoke with respect to the guide member to be lower.

The guide member can be made of resin or the like, for example, to solve the above problems. In particular, with a resin guide it is possible to reduce the weight of the guide member and improve the slidability of the clutch yoke. However, it has been found that forming the guide member from resin can compromise the strength of the guide member.

The present invention has been made in view of the above-mentioned problems and the purpose of the invention is to provide a dual-bearing reel capable of simultaneously reducing the weight of the guide member, improve the slidability of the clutch yoke and ensure the strength of the guide member.

A dual-bearing reel according to one aspect of the present invention includes a clutch mechanism for connecting and disconnecting a handle and a spool. The dual-bearing reel includes a frame, a clutch yoke and a guide member.

A handle shaft of the handle is connected to the frame. The clutch yoke has through holes, and can switch the clutch mechanism between an engaged state and a disengaged state.

The guide member guides the clutch yoke in the axial direction. The guide member includes a metal body mounted on the frame, metal shaft members extending from the body in the axial direction and resin cover portions covering the shaft members and inserted into through holes of the clutch yoke.

In this dual-bearing reel, the body and the shaft members of the guide member are made of metal and the cover portions of the guide member are made of resin. Thus, it is possible to reduce the weight of the guide member and maintain or improve the slidability of the clutch yoke with the resin cover portions, while ensuring the strength of the guide member with the metal body and the metal shaft members. That is, in this dual-bearing reel, it is possible to simultaneously reduce the weight reduction of the guide member, provide excellent slidability of the clutch yoke and maintain the strength of the guide member.

With a dual-bearing reel according to another aspect of the present invention, it is preferable for the clutch yoke to be arranged on the guide member on the outside in the radial direction in the above-mentioned engaged state. With this configuration, the clutch yoke can be suitably held by the metal shaft members in the above-mentioned engaged state.

With a dual-bearing reel according to another aspect of the present invention, it is preferable that at least a part of the shaft members of the guide member are arranged inside of through holes of the clutch yoke in the above-mentioned engaged state. In this configuration, the clutch yoke can be suitably held by the metal shaft members in the above-mentioned engaged state.

With a dual-bearing reel according to another aspect of the present invention, it is preferable for the resin cover portions to have a hole portion. In this embodiment, a shaft member is pressed into the hole. With this configuration it is possible to suitably apply the resin cover portion to the metal shaft member.

With a dual-bearing reel according to another aspect of the present invention, it is preferable that a part of the hole portion of the cover portion, which a shaft member of a guide member is arranged in, has a smaller inner diameter than the outer diameter of the shaft member of the guide member.

With this configuration, the resin cover portion can be held by the tip of the metal shaft member. That is, even if the opening of the resin cover portion is thin, the opening of the resin cover portion is less likely to receive a pressing force from the metal shaft member. Thus, the durability of the cover portion can be improved.

With a dual-bearing reel according to another aspect of the present invention, it is preferable that a shaft member of a guide member has a tapered shape. In this embodiment, by forming the shaft member of the guide member in a tapered shape, the resin cover portion can be suitably attached to the metal shaft member.

With a dual-bearing reel according to another aspect of the present invention, it is preferable to further include side covers that are attached to a frame. In this embodiment, the tips of cover portions are arranged to face at least one of the side covers. The length of the shaft members is larger than the space between the tips of the cover portions and the side cover. With this configuration, it is possible to avoid the cover portions from separating from the shaft members, even if the cover portions move toward the side cover when the cover portions are attached to the shaft members.

With a dual-bearing reel according to another aspect of the present invention, it is preferable for the body and the shaft members of the guide member to be die cast-molded with alloy containing aluminum. With this configuration it is possible to form the body and the shaft members accurately.

With the present invention, it is possible to simultaneously reduce the weight of a guide member, maintain or improve the slidability of a clutch yoke with respect to the guide member and ensure sufficient strength of the guide member.

DETAILED DESCRIPTION OF EMBODIMENTS

Figure 1:
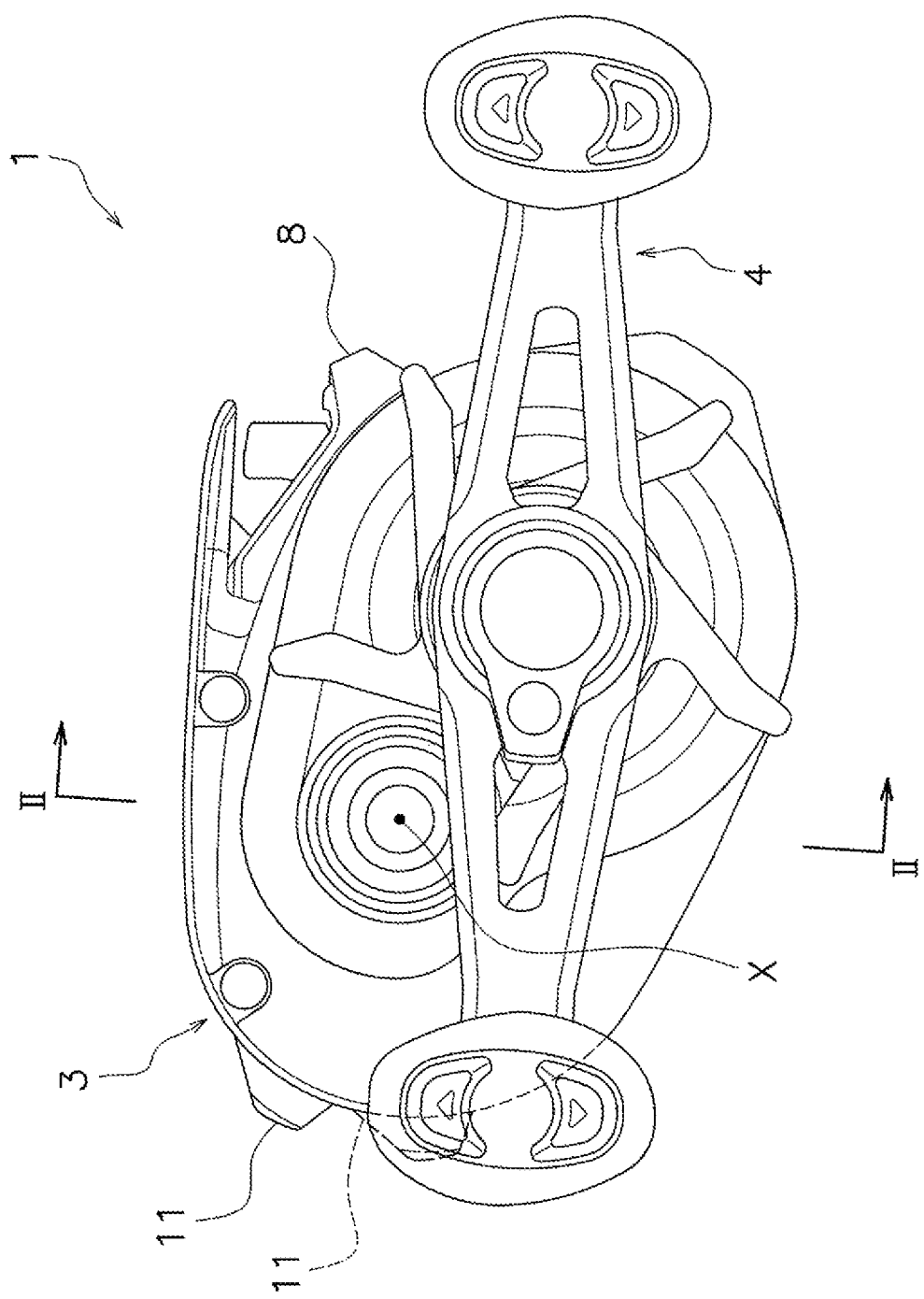
FIG. 1 is a side view of a dual-bearing reel according to an embodiment of the present invention.
Figure 2:
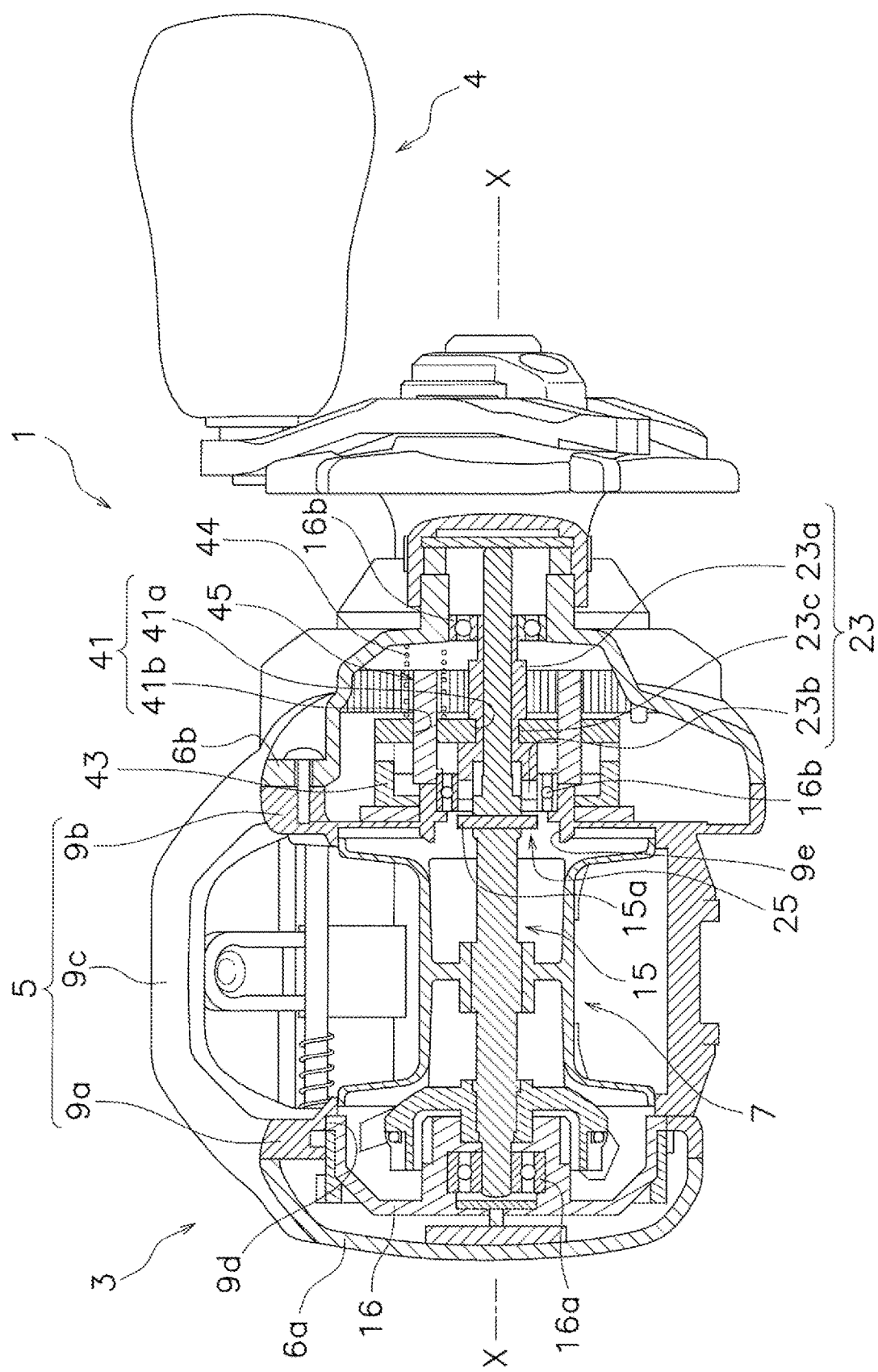
FIG. 2 is a cross-sectional view of the dual-bearing reel, taken along line H-E in FIG. 1.

A dual-bearing reel 1 according to one embodiment of the present invention, as shown in FIG. 1, includes a reel body 3 which can be attached to a fishing rod, a handle 4 for spinning a spool arranged on a side of the reel body 3, and a spool 7 rotatably attached on the reel body 3 (See FIG. 2).

Figure 3:
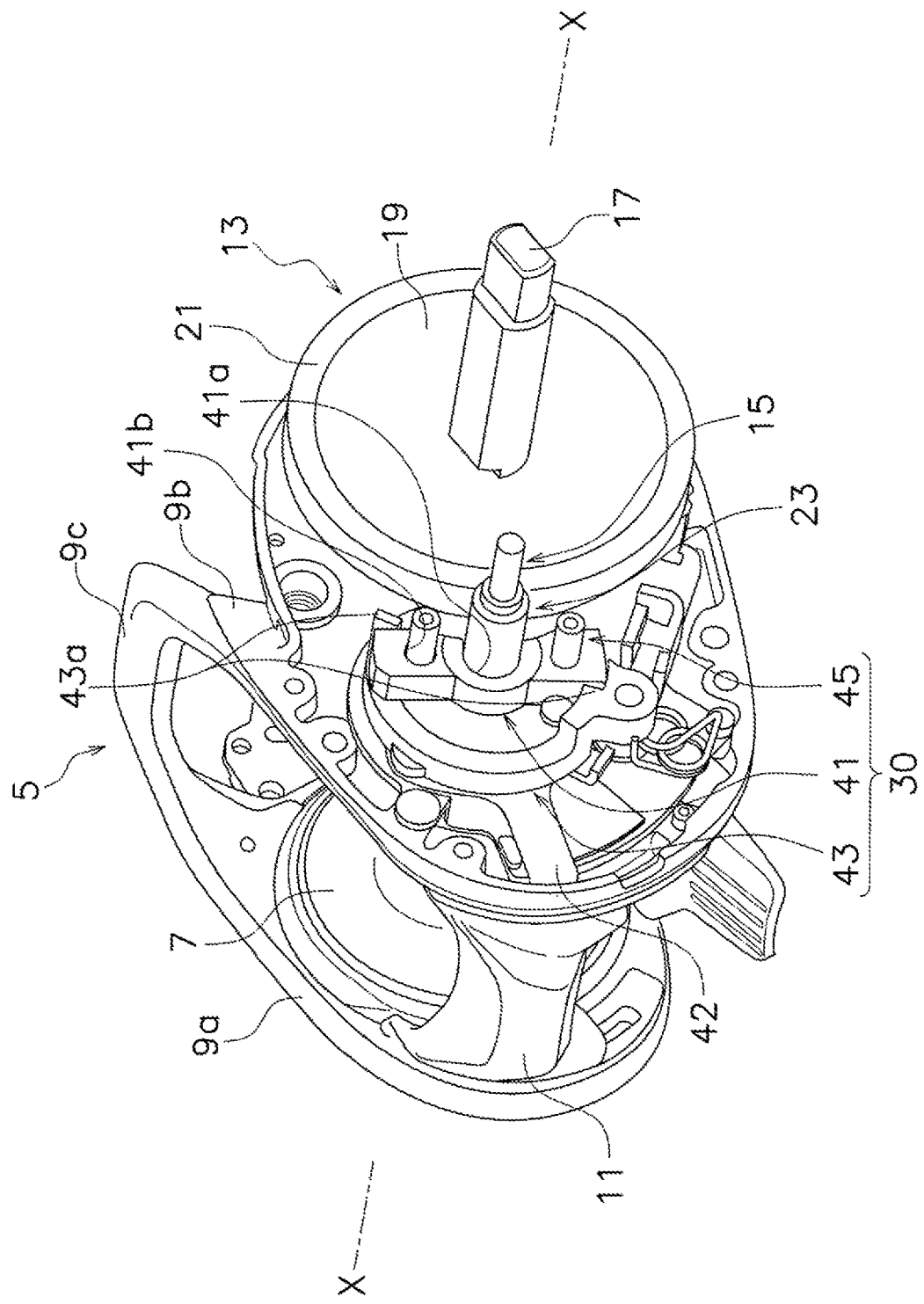
FIG. 3 is a perspective view of a clutch control device arranged on the frame of the dual-bearing reel.

As shown in FIG. 2, the dual-bearing reel 1 additionally includes a clutch mechanism 25 which is capable of connecting and disconnecting the handle 4 and the spool 7. As shown in FIGS. 2 and 3, the dual-bearing reel 1 additionally includes a frame 5, a clutch yoke 41 and a guide member 45.

The rotational center axis of the spool 7 is spool axial center X below. Additionally, the direction the spool axial center X extends and the direction along the spool axial center X is the "spool axial direction (one example of an axial direction)." The direction around the spool axial center X with the spool axial center X as the center is the "circumferential direction (rotational direction)." The direction apart from the spool axial center X with the spool axial center X as the center is the "radial direction."

The direction a fishing line is cast or delivered (line-delivery or line-casting direction) is the "front." The opposite direction of the line-casting direction is the "back." The portion located on the "front" of the dual-bearing reel 1 is the "front portion." The portion located on the "back" of the dual-bearing reel 1 is the "back portion."

Reel Body

As shown in FIG. 2, the reel body 3 includes the frame 5, a first side cover 6a and a second side cover 6b, the side covers 6a and 6b are attached to cover both sides of the frame 5, and a front cover 8 is attached to the front portion of the frame 5 (See FIG. 1).

The frame 5 includes a first side plate 9a and a second side plate 9b that are arranged to face each other with a space between. The first side plate 9a and the second side plate 9b are connected by the connecting part 9c. The frame 5 supports a handle shaft 17 of the handle 4.

The first side plate 9a has a first opening 9d. A bearing housing part 16 is fixed within the first opening 9d. A clutch control device 30 (See FIG. 3) is attached to the second side plate 9b. The second side plate 9b has a second opening 9e through which a spool shaft 15 passes. The first side cover 6a is attached to the first side plate 9a of the frame 5. The second side cover 6b is attached to the second side plate 9b of the frame 5.

As shown in FIGS. 2 and 3, the spool 7 and a clutch operating member 11 are arranged between the first side plate 9a and the second side plate 9b. As shown in FIG. 3, a rotation transmission mechanism 13 and the clutch control device 30 are arranged between the frame 5 and the second side cover 6b, for example. That is, the dual-bearing reel 1 additionally includes the clutch operating member 11, the rotation transmission mechanism 13 and the clutch control device 30.

Spool

As shown in FIGS. 2 and 3, the spool 7 is rotatably arranged between the first side plate 9a and the second side plate 9b. The spool 7 is fixed on the spool shaft 15 so as to be able to rotate integrally with the spool shaft 15.

The spool shaft 15 is configured to be capable of rotating with respect to the reel body 3. For example, as shown in FIG. 2, one end of the spool shaft 15 is rotatably supported relative to the first side plate 9a via a shaft bearing 16a which is disposed on the bearing housing part 16. The other end of the spool shaft 15 is rotatably supported relative to the second side plate 9b via a pinion gear 23. An engagement pin 15a that forms the clutch mechanism 25 is attached to the spool shaft 15.

Clutch Operating Member

As shown in FIGS. 1 and 3, the clutch operating member 11 is disposed on the back portion of the reel body 3. The clutch operating member 11 is connected to the clutch control device 30. The clutch operating member 11 is configured to be movable between the clutch ON (engaged) position (See the solid line of FIG. 1) and the clutch OFF (disengaged) position (See the broken line of FIG. 1). The clutch operating member 11 is also used as a thumb rest when thumbing.

Rotation Transmission Mechanism

The rotation transmission mechanism 13 transmits the rotative force from the handle 4 to the spool 7. As shown in FIG. 3, for example, the rotation transmission mechanism 13 includes the handle shaft 17, a drag mechanism 19, a drive gear 21 and the pinion gear 23.

The handle 4 is attached to the handle shaft 17. The handle shaft 17 is rotatably supported by the frame 5. For example, the handle shaft 17 is rotatably supported on the second side cover 6b and the frame 5.

The drag mechanism 19 transmits the rotation of the handle shaft 17 to the drive gear 21 and brakes the rotation of the spool 7. As shown in FIG. 3, the drag mechanism 19 is arranged between the handle shaft 17 and the drive gear 21.

The drive gear 21 is rotatably attached on the handle shaft 17. As shown in FIG. 3, the rotation of the handle shaft 17 is transmitted to the drive gear 21 via the drag mechanism 19. When a torque greater than a predetermined value acts on the spool 7 when the fishing line is cast, the drag mechanism 19 is disengaged and the drive gear 21 rotates relatively with the handle shaft 17.

The pinion gear 23 transmits the rotation of the drive gear 21 to the spool shaft 15. As shown in FIGS. 2 and 3, the pinion gear 23 is a substantially cylindrical shape and arranged on the outer peripheral side of the spool shaft 15. The pinion gear 23 is rotatably supported relative to the frame 5, for example, by the second side cover 6b and the second side plate 9b via the shaft bearing 16b.

As shown in FIG. 2, the pinion gear 23 includes an oblique tooth part 23a, an engagement groove 23b and a small diameter portion 23c. The tooth part 23a meshes with the drive gear 21. The engagement groove 23b is formed on the end of the pinion gear 23 and extends in the radial direction. The small diameter portion 23c is formed between the tooth part 23a and the engagement groove 23b. The clutch yoke 41 engages the small diameter portion 23c.

Clutch Mechanism

The clutch mechanism 25 is configured to be able to connect the handle 4 and the spool 7 and to disconnect the handle 4 and the spool 7. As shown in FIG. 2, the clutch mechanism 25 includes the engagement groove 23b of the pinion gear 23 and the engagement pin 15a of the spool shaft 15.

For example, when the pinion gear 23 moves in the direction away from the spool 7 along the spool shaft 15 and the engagement of the engagement groove 23b and the engagement pin 15a of the spool shaft 15 is released, the clutch is turned off (disengaged state). In this situation, the spool 7 can freely rotate.

On the other hand, when the pinion gear 23 moves in the direction approaching the spool 7 along the spool shaft 15 and the engagement groove 23b engages the engagement pin 15a, the clutch is turned on (engaged state). In this situation, the spool 7 rotates in association with the rotation of the handle shaft 17.

Clutch Control Device

The clutch control device 30 is configured to be able to control the clutch mechanism 25 in accordance with the operation of the clutch operating member 11. As shown in FIG. 3, the clutch control device 30 includes the clutch yoke 41, a clutch cam 43 and the guide member 45.

Clutch Yoke

The clutch yoke 41 is configured to switch the clutch mechanism 25 between the clutch ON state and the clutch OFF state. As shown in FIG. 3, the clutch yoke 41 is guided in the spool shaft direction by the clutch cam 43 and the guide member 45. The clutch yoke 41 is biased toward the spool 7 by a biasing member 44 (See FIG. 2).

As shown in FIGS. 2 and 3, the clutch yoke 41 includes an engaging recess 41a which can be engaged with the pinion gear 23 and a pair of guide holes 41b (one example of through holes). The engaging recess 41a is engaged with the small diameter portion 23c of the pinion gear 23 (See FIG. 2).

The pair of guide holes 41b extend through the clutch yoke 41 in the spool axis direction. The cover portions 49 (described later) of the guide member 45 are inserted into the guide holes 41b. Both ends of the clutch yoke 41 are engaged with the clutch cam 43.

Clutch Cam

The clutch cam 43 is to move the clutch yoke 41 in the spool shaft direction. The clutch cam 43 is arranged on the guide member 45 so as to be able to rotate around the spool axial center X.

As shown in FIG. 3, a connecting member 42 is attached to the clutch cam 43. The connecting member 42 connects the clutch operating member 11 and the clutch cam 43. When the clutch operating member 11 is operated, the clutch cam 43 turns via the connecting member 42. The clutch cam 43 is arranged on the outer peripheral side of the guide member 45 and is rotatable with respect to the guide member 45.

The clutch cam 43 has a cam portion 43a to guide the clutch yoke 41 in the axial direction. When the clutch cam 43 is turned by the operation of the clutch operating member 11, the cam portion 43a presses both ends of the clutch yoke 41. Then, both ends of the clutch yoke 41 are moved in the spool shaft direction apart from the spool 7. Thus, the clutch mechanism 25 is switched from the clutch ON state to the clutch OFF state.

On the other hand, when a clutch return mechanism (not shown) is activated by operation of the handle 4, the clutch cam 43 turns in the opposite direction of the above-mentioned turning direction. Then, both ends of the clutch yoke 41 are moved in the spool shaft direction so as to approach the spool 7. Thus, the clutch mechanism 25 is switched from the clutch OFF state to the clutch ON state.

Guide Member

Figure 4:
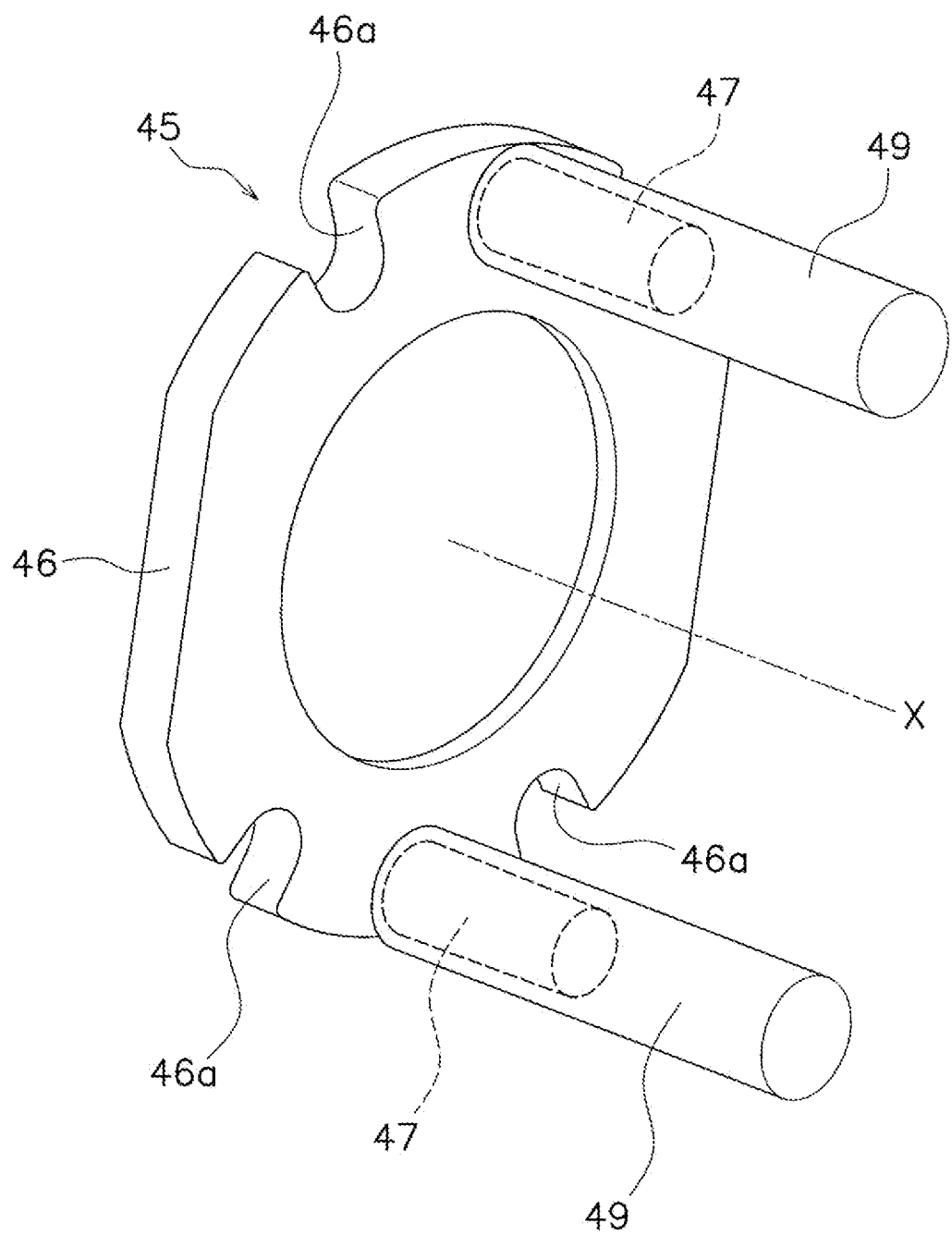
FIG. 4 is a perspective view of a guide member.

The guide member 45 guides the clutch yoke 41 in the spool shaft direction. As shown in FIGS. 2 and 3, the guide member 45 is attached to the frame 5. As shown in FIG. 4, the guide member 45 includes a metal body 46, a pair of metal bosses 47 (one example of shaft member) and a pair of resin cover portions 49.

Figure 5:
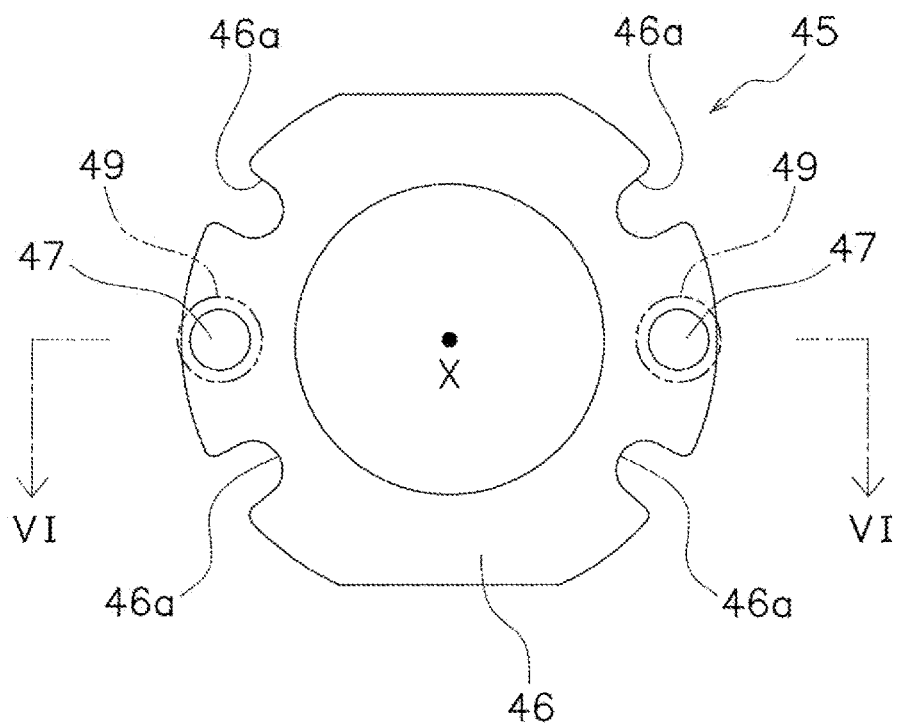
FIG. 5 is a top view of the guide member.

The body 46 is attached to the frame 5. In detail, as shown in FIGS. 4 and 5, the body 46 is formed in a substantially annular disk shape. The body 46 is fixed to the second side plate 9b by a fixing means or device (i.e., a fixer), for example, screws (not shown), via recesses 46a disposed on its outer circumference.

Figure 6:
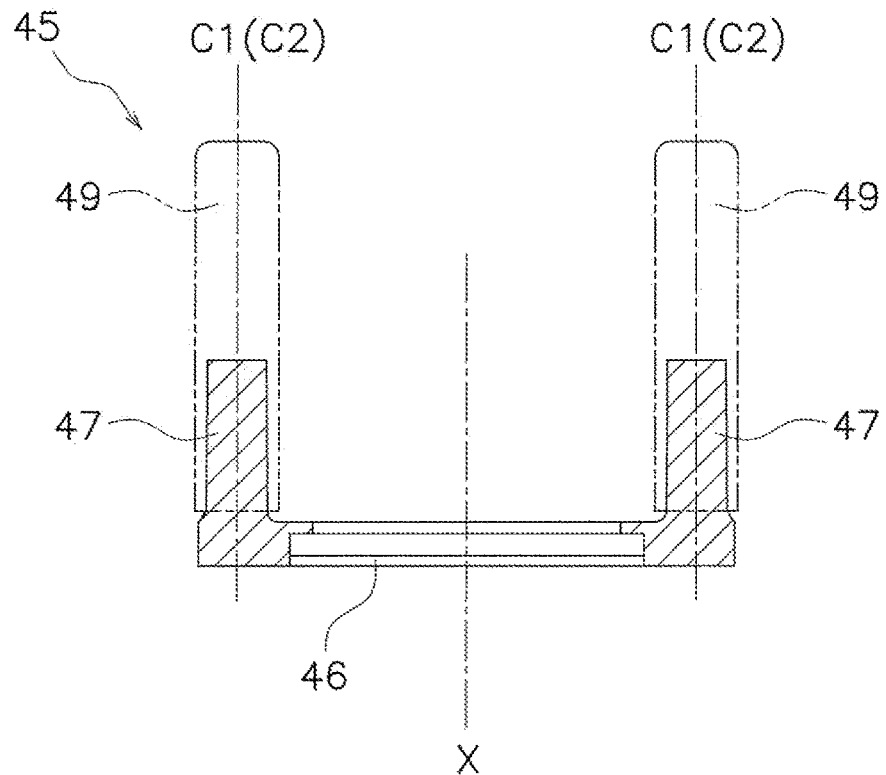
FIG. 6 is a cross-sectional view of the guide member, taken along line VI-VI in FIG. 5.

As shown in FIGS. 4 to 6, the pair of bosses 47 extend from the body 46 in the spool shaft direction. Each of the bosses 47 can be formed in a tapered shape. More specifically, each of the bosses 47 can be formed in a truncated cone shape. Each of the bosses 47 can be integral with the body 46. For example, each of the bosses 47 and the body 46 can be die cast-molded with alloy containing aluminum.

When the bosses 47 are viewed from the outside of the respective boss 47 in the radial direction, the outer peripheral surface of each boss 47 is tapered in the axial direction of the boss 47. The maximum outer diameter of each boss 47 is the outer diameter on the proximal end of each boss 47. The minimum outer diameter of each boss 47 is the outer diameter on the distal end of each boss 47. A first taper angle $\alpha 1$ of each boss 47 is a predetermined angle (See FIG. 6).

Figure 7A:
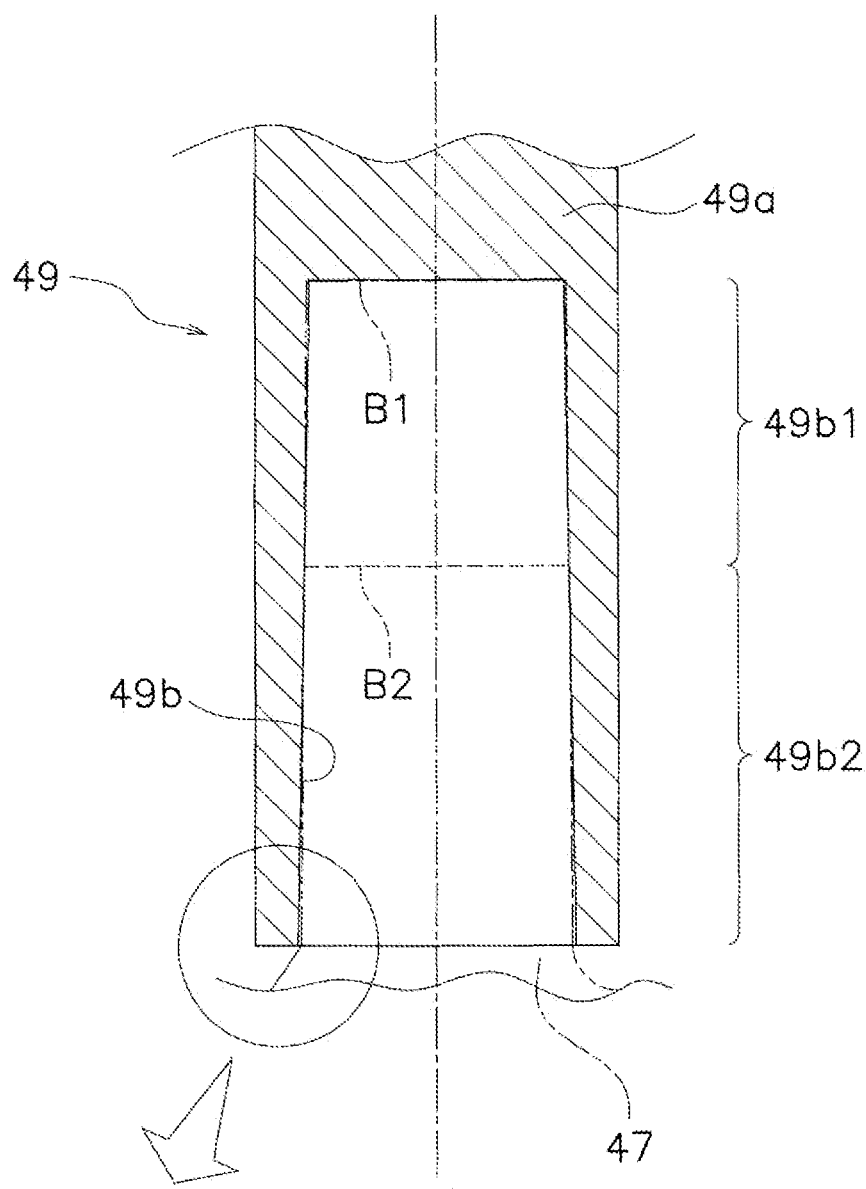
FIGS. 7A and 7B illustrate an enlarged cross-sectional view of the guide member and one end of the guide member.
Figure 7B:
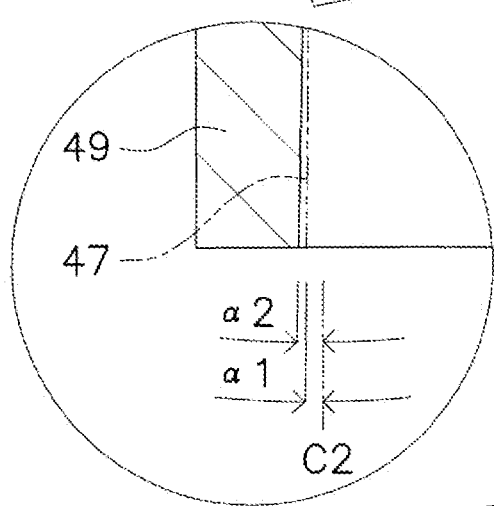

The boss 47 includes axial center C1. The first taper angle $\alpha 1$ shown in FIGS. 7A and 7B is the angle with respect to the axial center C1 of the boss 47. The axial direction of the boss 47 is defined as the direction in which the axial center C1 of the boss 47 extends. The radial direction of the boss 47 is defined as the direction apart from the axial center C1 of the boss 47 with the axial center C1 of the boss 47 as the center. When the guide member 45 is attached to the frame 5, the axial center C1 of the boss 47 is substantially parallel to the spool axial center X.

As shown in FIGS. 4 to 6, a pair of cover portions 49 cover the bosses 47. Each cover portions 49 is formed in a substantially cylindrical shape with a bottom. Each cover portions 49 is made of synthetic resin.

As shown in FIGS. 7A and 7B, each cover portion 49 includes a shaft body 49a and a hole 49b. The shaft body 49a is formed in a substantially cylindrical shape. The hole 49b is disposed in the shaft body 49a. The hole 49b extends from one end to the other end of the shaft body 49a. Thus, the boss 47 can be pressed into the hole 49b.

That is, each of the cover portions 49 is attached to a respective one of the bosses 47. Each of the cover portions 49 is inserted into the guide holes 41*b* of the clutch yoke 41 when each of cover portions 49 is attached to a respective boss 47. Each of the cover portions 49 can be adhered to a respective boss 47 with adhesive or the like.

A detailed description of the hole 49*b* in each cover portion 49 is recited below. The hole 49*b* is formed be a tapered hole as is clear when each of the cover portions 49 is not attached to a respective boss 47. A second taper angle α 2 of the hole 49*b* is a predetermined angle. The second taper angle α 2 is larger than the first taper angle α 1. The cover portion 49 includes axial center C2. The second taper angle α 2 is the angle to the axial center C2 of the cover portion 49.

When the cover portion 49 is attached to the boss 47, the axial center C2 of the cover portion 49 substantially coincides with the axial center C1 of the boss 47.

The axial direction of the cover portion 49 is defined as the direction in which the axial center of the cover portion 49 extends. The radial direction of the cover portion 49 is defined as the direction extending away from (perpendicularly to) the axial center C2 of the cover portion 49 with the axis center of the cover portion 49 as the center.

The minimum inner diameter of the hole 49*b* is smaller than the minimum outer diameter of the boss 47. The minimum inner diameter of the hole 49*b* is the inner diameter of the hole 49*b* at the bottom side. The minimum outer diameter of the boss 47 is the outer diameter of the boss 47 at the distal end.

The maximum inner diameter of the hole 49*b* is larger than the maximum outer diameter of the boss 47. The maximum inner diameter of the hole 49*b* is the inner diameter of the hole 49*b* at the opening side. The maximum outer diameter of the boss 47 is the outer diameter of the boss 47 at the proximal end.

As shown in FIGS. 7A and 7B, the hole 49*b* includes a first portion 49*b*1 and a second portion 49*b*2. FIGS. 7A and 7B illustrate the state in which the cover portions 49 are not attached to the bosses 47.

The first portion 49*b*1 is a portion where a tip of the boss 47 is disposed. The first portion 49*b*1 has an inner diameter smaller than the outer diameter of the boss 47. For example, the inner diameter of the first portion 49*b*1 is smaller than the outer diameter of the tip of the boss 47.

The minimum inner diameter of the first portion 49*b*1 is the inner diameter of the hole 49*b* at the bottom side. The minimum inner diameter of the first portion 49*b*1 is smaller than the maximum outer diameter of the distal end B1 of the boss 47. The maximum inner diameter of the first portion 49*b*1 is smaller than the maximum outer diameter of the proximal end B2 of the tip of the boss 47.

The second portion 49*b*2 is a portion where the portion excluding the tip of the boss 47 is arranged, for example, a portion where the proximal end of the boss 47 contacts. The second portion 49*b*2 has an inner diameter larger than the outer diameter of the boss 47. For example, the inner diameter of the second portion 49*b*2 is larger than the outer diameter of the proximal end of the boss 47.

By constructing the hole 49*b* of each cover portion 49 in this way, the tip of the boss 47 is pressed into the first portion 49*b*1. The second portion 49*b*2 and the proximal end of the boss 47 can be in contact or not in contact. Thus, even when the hole 49*b* is a tapered hole, the thin section on the opening side of the hole 49*b* is less likely to receive the pressing force from the boss 47. That is, it is possible to improve the durability of the cover portion 49.

Figure 8:
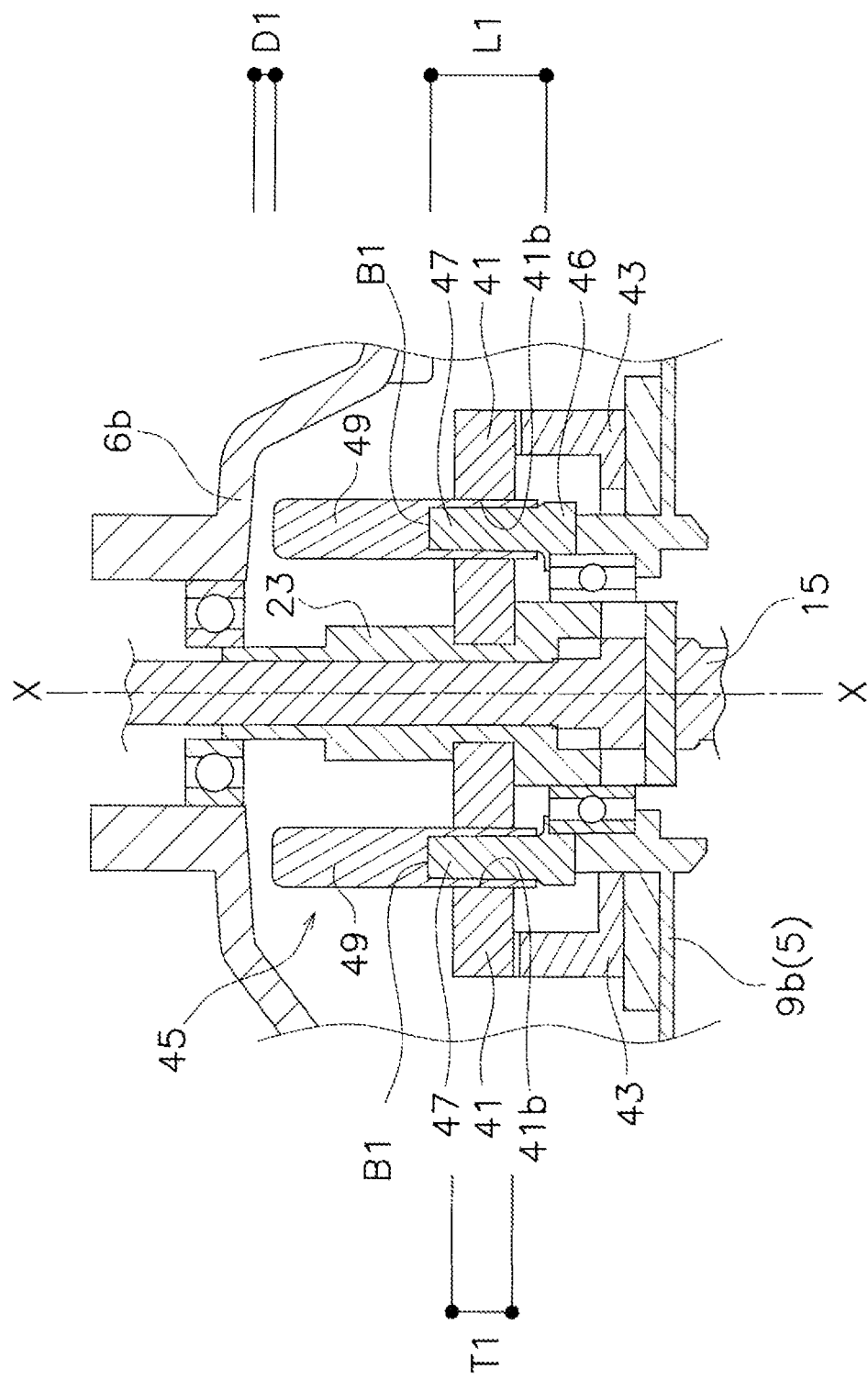
FIG. 8 is an enlarged cross-sectional view of the clutch control device, taken along line II-II in FIG. 1.

As shown in FIG. 8, the guide member 45 with the above-described configuration is attached to the frame 5 (the second side plate 9*b*), the tips of the cover portions 49 are arranged so as to face the second side cover 6*b*. More particularly, the tips of the cover portions 49 are arranged so as to face the second side cover 6*b* in the spool shaft direction.

The space D1 between the tips of each cover portion 49 and the second side cover 6*b*, that is, the space in the axial direction between the tips of each cover portion 49 and the second side cover 6*b*, is smaller than the length L1 of each of the bosses 47. The space D1 in the axial direction is the smallest space in the spool shaft direction. The length L1 of each of the bosses 47 is more than half of the thickness T1 of the clutch yoke 41. In this embodiment, the length L1 of the boss 47 is larger than the thickness T1 of the clutch yoke 41.

Here, the length of the boss 47 is the length in spool shaft direction. For example, the length L1 of the boss 47 is the length from the outer surface of the body 46 to the distal end of the boss 47. The length L1 of the boss 47 can also be construed as the length of the boss 47 arranged inside of the hole 49*b* of the cover portion 49.

As shown in FIG. 8, when the clutch mechanism 25 is in the clutch ON state, the clutch yoke 41 is arranged on the outside of the bosses 47 of each guide member 45 in the radial direction. For example, when the clutch mechanism 25 is in the clutch ON state, at least a part of the bosses 47 are arranged inside of the guide holes 41*b* of the clutch yoke 41.

In this embodiment, the bosses 47 pass through inside of the guide holes 41*b* of the clutch yoke 41 when the clutch mechanism 25 is in the clutch ON state. That is, when the clutch mechanism 25 is in the clutch ON state, the clutch yoke 41 is arranged between the tips B1 of the bosses 47 and the body 46.

In the above-mentioned dual-bearing reel 1, the body 46 and the bosses 47 of the guide member 45 are made of metal and the cover portions 49 of the guide member 45 is made of resin. Thus, it is possible to reduce the weight of the guide member 45 and improve the slidability of the clutch yoke 41 with resin cover portions 49, while ensuring the strength of the guide member 45 with the metal body 46 and the metal bosses 47. That is, with the dual-bearing reel 1, it is possible to simultaneously reduce the weight of the guide member 45, improve or maintain the slidability of the clutch yoke 41 and ensure a sufficient strength of the guide member 45.

Additionally, the clutch yoke 41 is arranged on the outside of the bosses 47 of the guide member 45 in the radial direction, when the clutch mechanism 25 is in the clutch ON state. Therefore, it is possible to suitably hold the clutch yoke 41 by the metal bosses 47.

Additionally, at least a part of the bosses 47 of the guide member 45 are arranged inside of the guide holes 41*b* of the clutch yoke 41 when the clutch mechanism 25 is in the clutch ON state. Thus, it is possible to suitably hold the clutch yoke 41 by the metal bosses 47.

Also, by pressing the metal bosses 47 into the holes 49*b* of the resin cover portions 49, it is possible to suitably attach the resin cover portions 49 to the metal bosses 47.

Additionally, the inner diameter of the first portion 49*b*1 of the resin cover portion 49 is smaller than the outer diameter of the boss 47 of the guide member 45, and thus, the resin cover portion 49 can be held by the tip of the metal boss 47. That is, even if the opening of the resin cover portion is thin, the cover portion 49 is less likely to receive a pressing force from the metal boss 47. Thus, it is possible to improve the durability of the cover portion 49.

Additionally, it is possible to suitably attach the resin cover portion 49 to the metal boss 47 by forming the metal boss 47 of the guide member 45 in a tapered shape.

Also, the length of the boss 47 is larger than the space between the tip of the cover portion 49 and the second side cover 6b. Thus, it is possible to avoid the cover portion 49 from separating from the boss 47 even if the cover portion 49 moves toward the second side cover 6b.

Additionally, the body 46 and the bosses 47 on the guide member 45 can be die cast-molded with alloy containing aluminum. Therefore, the body 46 and the bosses 47 can be accurately formed.

Other Embodiment

Although one embodiment of the present invention is described above, the present invention is not limited to the above embodiment. Instead, various modifications can be made without departing from the gist of the invention.

In the above embodiment, an example was described, in which the boss 47 is tapered. However, the boss 47 can be formed to be cylindrical. Also, it is possible to form the bosses 47 such that only the tip is tapered and the proximal end of the bosses 47 is cylindrical.

In the above embodiment, an example was described, in which the entire hole 49b is formed to be a tapered hole. However, it is possible the hole 49b such that only the first portion 49b1 of the hole is tapered.

What is claimed is:

1. A dual-bearing reel comprising:
   a handle having a handle shaft;
   a spool;
   a clutch mechanism configured to connect and disconnect the handle and the spool;
   a frame supporting the handle shaft of the handle;
   a clutch yoke having through holes, and configured to switch the clutch mechanism between an engaged state and a disengaged state; and
   a guide member having a metal body attached to the frame, metal shaft members extending from the body in an axial direction and resin cover portions covering the shaft members and configured to be disposed in the through holes, the guide member being configured to guide the clutch yoke in the axial direction.

2. The dual-bearing reel according to claim 1, wherein the clutch yoke is arranged on an outside of the shaft members in a radial direction in the engaged state.

3. The dual-hearing reel according to claim 2, wherein a part of the shaft members is arranged inside of the through holes in the engaged state.

4. The dual-bearing reel according to claim 1, wherein the cover portions have holes; and
   the shaft members are disposed within the holes.

5. The dual-bearing reel according to claim 4, wherein a portion of the holes in which tips of the shaft members are disposed has a smaller inner diameter than an outer diameter of the shaft members.

6. The dual-bearing reel according to claim 5, wherein the shaft members are tapered.

7. The dual-bearing reel according to claim 1, further comprising
   a side cover attachable to the frame,
   tips of the cover portions are arranged to face the side cover and define a space therebetween, and
   a length of the shaft members is larger than the space between the tips of the cover portions and the side cover.

8. The dual-bearing reel according to claim 1, wherein the body and the shaft members are die cast-molded with alloy containing aluminum.

* * * * *